July 2, 1963　　　　　C. R. FOGG　　　　　3,095,801
BEVERAGE PERCOLATING APPARATUS WITH UNIT DRY BEVERAGE CONTAINER
Filed Sept. 19, 1960

INVENTOR.
CHARLES R. FOGG
BY
Lynn W. Latta
ATTORNEY

United States Patent Office 3,095,801
Patented July 2, 1963

3,095,801
BEVERAGE PERCOLATING APPARATUS WITH UNIT DRY BEVERAGE CONTAINER
Charles R. Fogg, 130 Ivalee St., Playa Del Rey, Calif.
Filed Sept. 19, 1960, Ser. No. 57,017
3 Claims. (Cl. 99—312)

This invention relates to a unique method and two-part device for the percolating of coffee, tea, or other beverage prepared from a fresh vacuum packed dry ground substance. The device provides in combination, a package, in the form of a sealed container, containing an amount of dry coffee (or other beverage material) and a specialized and novel circulator head which, being of a pointed design, is inserted into the sealed coffee container, for the percolation of the beverage. When in use this circulator head is mounted upon an ordinary tubular percolator pump, which when set on its base in boiling water, pumps the water to the circulator head above it and thus begins the novel percolation process described hereafter.

A particular object of the invention is to provide a unit-volume coffee container which contains just the right amount of dry ground coffee for the preparation of a predetermined number of cups of liquid coffee for one serving and which may be removed from the circulator head after use and disposed of as a unit, still containing the used coffee grounds. Thus at each serving, completely fresh coffee is available.

A further object of the invention is to provide, for use with the circulator head, a coffee package embodying an inexpensive container of relatively sturdy foil or similar metallic of comparable plastic material which is substantially non-corrodible and non-toxic with respect to such beverage as coffee being percolated therein. More particularly the invention contemplates a coffee container and circulator head adapted for conjoint use in a novel method wherein the circulator head is inserted into the container through the bottom thereof and is then coupled to the upper end of a percolator pump, wherein the circulator head functions to deliver from the pump into the container, above the body of ground coffee therein, the heated water which is pumped upwardly by the pump, and wherein the liquid coffee which is brewed as the result of the drainage of the heated water downwardly through the body of ground coffee, reenters the circulator head which then functions as a spout or discharge nozzle, to deliver the brewed coffee into a receptacle (e.g. the pot, pan or other receptacle in which the water is heated).

The unit container of my invention may also be provided with small perforations on its underside through which brewed coffee may discharge, and a relatively large central mouth in its under side only, into which the somewhat larger circulator head is inserted, providing an interference seal with the rim of said mouth.

Another object is to provide such a unit container, into which the dry beverage may be vacuum packed, provided with a pull-off seal covering the entire bottom side of the container, which, when removed, exposes the perforations in the container as well as the central mouth which receives the circulator head. The seal may be fabricated of metal foil, plastic or any equivalent sealable material.

A most important object of the invention is to provide a unique circulator head, constructed of metal, sturdy plasticized material, or similar material. This circulator head is of more or less pointed tapering design and is adapted to be inserted through the bottom of the unit container, making entry by piercing the bottom or by inserting it into the mouth of the aforementioned container with bottom seal, providing a seal fit with the bottom. More particularly the head is of hollow construction and is provided with a series of slits or openings in its upper end through which hot water is pumped, by means of the aforementioned common percolator pump, into the coffee container and down over the coffee. Said circulator head is further provided with a multiplicity of perforations which are located circumferentially around the lower portion of the circulator head adjacent the base of the head, which perforations receive the boiling water after it has passed through the coffee and permit it to drain downwardly to the original receptacle in which the water is boiling. This process then may repeat itself several times until the desired strength of coffee has been obtained. Thus the circulator head itself is seen to perform the entire task of percolation, as one unit, when used in combination with the novel coffee container aforedescribed.

A further object of the invention is to provide such a circulator head in a form which makes it possible for such head to be either a die cast item or one stamped out of suitable metal or other material of similar strength and quality.

Other objects and advantages will become apparent in the ensuing specification and the appended drawing in which.

Figure 1:
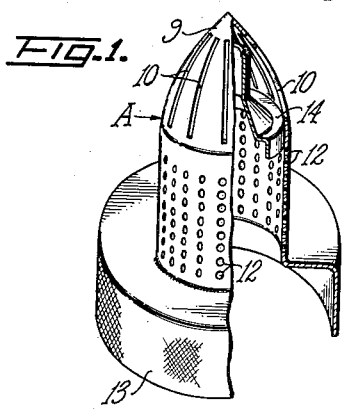
FIG. 1 is a perspective view of the circulator head, shown partly in section.
Figure 2:
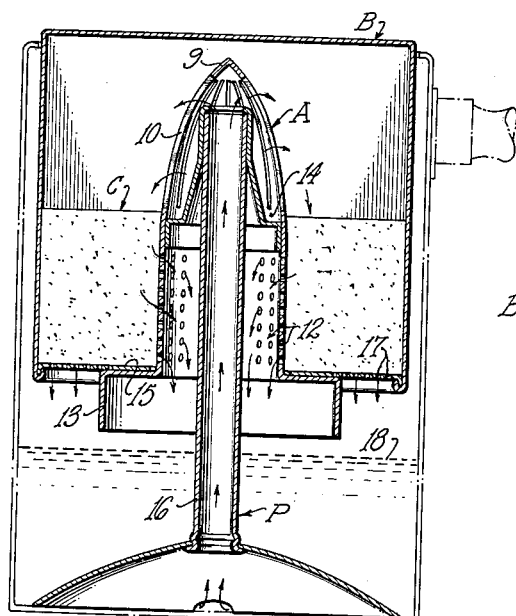
FIG. 2 is an axial sectional view of the circulator head shown inserted into the coffee container and mounted on a pump, the entire combination being set into a percolator pot large enough to contain it.

Referring now to the drawings in detail, I have shown in FIGS. 1 and 2 thereof, as an example of one form in which the invention may be embodied, a circulator head A, adapted to cooperate with a unit coffee container B in brewing a coffee beverage from a body of ground coffee C therein. Circulator head A comprises a tubular body having a pointed upper end 9 at the apex of upwardly conveying sides provided with slits 10 through which water is pumped by means of an ordinary percolator pump inserted upwardly through the hollow center 11 of the circulator head. Also shown are a large number of circumferentially arranged perforations 12 which encircle the lower portion of the circulator head A from approximately its base 13 up to the mid point on the head, and through which the hot beverage is percolated. Also embodied in the upper portion of the head is a catch basin 14, the bottom of which is situated approximately at the lower ends of the slits 10, and which functions to equalize the flow of water pumped through the slits 10 by catching any water which is not pumped out through the upper ends of the slits 10, and draining it through the lower ends of slits 10 into the coffee, in order that no water will flow back into the percolator pot below without having first passed through the coffee container.

Referring now to FIG. 2, I have shown as a preferred form of my invention the circulator head A as described in FIG. 1 as inserted into the coffee container C and resting on the hollow pump P which is shown set in a percolator pot partly filled with water. The nose or upper portion of the circulator head A is shown protruding above the coffee level inside the container. The base 13 of the circulator head is engaged tightly against the bottom 15 of the container C. The hollow pump at its upper rim is positioned to engage the converging sides of the circulator head tip in order to limit lateral tilting thereof.

The operation of the device as shown in FIG. 2 is as follows: Boiling water is pumped upwardly through the pump tube 16 into the upper part of circulator head A where it is forced outwardly through the slits 10 and sprays downwardly into the body of coffee C, the catch basin 14 also contributing to this process by handling overflow, as described above. The water thus carried filters down through the dry ground beverage and in through the perforations 12 in the lower circulator head, thus draining back into the liquid 18 below. The pump shaft 16 of course does not occupy all the hollow area 11 inside the circulator head but merely the central part of such hollow area. Any liquid coffee which does not filter back through the perforations 12 in the circulator head will drip through the perforations 17 in the container bottom, down to the liquid 18 below. Thus the percolation process is complete.

Figure 3:
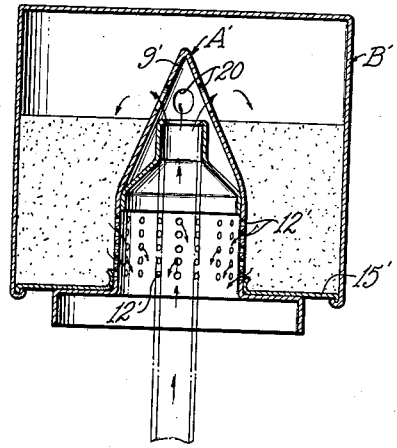
FIG. 3 is an axial sectional view of the simplified circulator head shown inserted into the coffee container.

Referring now to FIG. 3, I have shown a simplified version of the circulator head 9' inserted into the coffee container, in which head, instead of the slits 10 shown in FIG. 1, there are somewhat larger openings 20, through which the hot water is pumped into the container. This simplified version also contains the multiplicity of circumferential perforations 12' in the lower circulator head through which the beverages passes, exactly as in the preferred form, the basic percolation process being the same in both forms.

Figure 4:
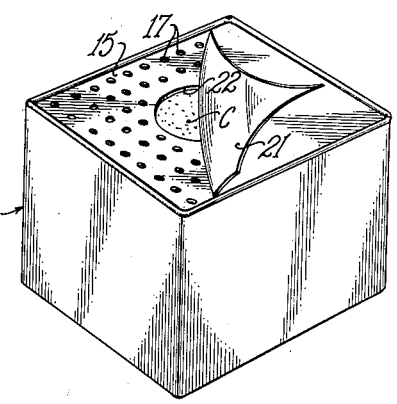
FIG. 4 is a perspective view of the rectangular (in this case square) form of the coffee container, showing (lower side up) the pull-off sealing sheet partly removed, thus revealing the perforations in the container and the central mouth which receives the circulator head.

Referring now to FIG. 4 I have shown the rectangular form of the disposable beverage container C as it looks just prior to use, and inverted. The seal 21 is partly pulled off, exposing the central mouth 22 which receives the circulator head 9, and exposing also the many perforations 17 which are found on the under side of the container. This seal 21 is removed at the time the coffee is prepared, thus insuring its freshness right up to the point of preparation. The coffee container may be constructed of durable foil or similar material and may contain reinforcement beads, at various strategic points in addition to its sturdy metallic or plasticized framework.

Figure 5:
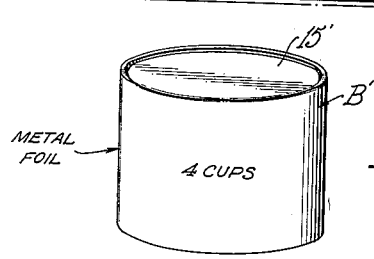
FIG. 5 is a perspective view of a circular form of the container which is substantially similar in construction to the square form, except for its general shape.

FIG. 5 shows, at B', a cylindrical form of the disposable container which is substantially similar in construction to the form in FIG. 4, except for its general overall shape. This container may be a simple foil container, with imperforate bottom and top, like an ordinary tin can except for its thinner walls. The sharp pointed tip 9' of circulator head A', is used to pierce the bottom 15' of container B', thus providing a mouth through which the head A' extends into the body of coffee C, and to which it is sealed.

Apertures 20 in tip 9' are shown as being circular in this form.

I claim:

1. Beverage percolating apparatus comprising, in combination: a package including a container comprising top and side walls and a bottom wall having a preformed circular opening at its center and a body of dry beverage material in said container in a quantity suitable for a single brewing of beverage from the entire volume thereof, said container adapted to have adhered to the under surface of said bottom wall a removable seal for closing said opening prior to the use of said package; and a circulator head comprising a cylindrical tubular body extending upwardly through said opening and fitted snugly therein, extending upwardly through said body of dry beverage material and having an upper end disposed adjacent said top wall, and having at its lower end an annular enlargement defining an upwardly facing annular shoulder upon which said bottom wall is seated so as to support the container on the head with said upper end disposed above said body of beverage material; said upper end being provided with a circumferential array of discharge apertures for discharging outwardly near the upper level of said body of beverage material, a plurality of jets of hot water to be pumped upwardly through said tubular body, for filtering downwardly through said dry beverage body, said tubular body having a plurality of inlets disposed in circumferential array near said annular shoulder, said inlets providing for flow of brewed beverage from the bottom area of said container into the lower portion of said tubular body, said tubular body having an open lower end for discharge of said brewed beverage downwardly into a receptacle; and means in said upper end of said tubular body providing a socket in spaced relation to said circumferential array of discharge apertures, said socket being of a shape and size to snugly receive the upper end of the tubular shaft of a percolator pump for pumping said hot water into said upper end as aforesaid.

2. Apparatus as defined in claim 1, wherein said container bottom has an annular array of discharge perforations around said opening, adapted to be closed by said seal prior to use of the package, said perforations adapted to assist the downward discharge of the brewed beverage into said receptacle.

3. Apparatus as defined in claim 1, wherein said socket means comprises an annular constricted wall substantially closing said tubular body below said discharge apertures so as to direct substantially all of the discharge from said pump outwardly through said apertures.

References Cited in the file of this patent

UNITED STATES PATENTS

| | | |
|---|---|---|
| Re. 11,015 | Thomson | July 23, 1889 |
| 2,020,104 | Collin | Nov. 5, 1935 |
| 2,121,613 | Schultz | June 21, 1938 |
| 2,284,416 | Gordon | May 26, 1942 |
| 2,883,922 | Andres | Apr. 28, 1959 |